United States Patent [19]

Croft

[11] Patent Number: 4,584,984

[45] Date of Patent: Apr. 29, 1986

[54] BARBECUE COVER SUPPORT DEVICE

[76] Inventor: Donald W. Croft, 1418 Kane St., San Diego, Calif. 92110

[21] Appl. No.: 701,410

[22] Filed: Feb. 14, 1985

Related U.S. Application Data

[63] Continuation-in-part of Ser. No. 502,690, Jun. 9, 1983, abandoned.

[51] Int. Cl.$^4$ ............................................. F24B 3/00
[52] U.S. Cl. ............................. 126/25 R; 126/41 R; 292/338
[58] Field of Search ............... 126/9 R, 9 B, 25 A, 126/25 AA, 25 R, 25 B, 25 C, 41 R; 220/85 CH; 292/288, 338, 339, 342; 248/351, 356, 354 R

[56] References Cited

U.S. PATENT DOCUMENTS

| | | | |
|---|---|---|---|
| 2,520,578 | 8/1950 | Treloar | 126/25 R |
| 2,792,773 | 5/1957 | Barker | 126/9 R |
| 2,921,175 | 1/1960 | Zaidan | 126/41 R |
| 3,320,942 | 5/1967 | Christensen | 126/25 C |
| 3,834,745 | 9/1974 | Coates | 292/288 |
| 3,938,495 | 2/1976 | Bauer et al. | 126/41 R |
| 4,026,266 | 5/1977 | Cremer | 126/25 A |
| 4,046,132 | 9/1977 | White | 126/25 A |
| 4,120,237 | 10/1978 | Mecherlen | 126/25 A |
| 4,192,283 | 3/1980 | Kridler et al. | 126/25 AA |
| 4,256,080 | 3/1981 | Seach | 126/25 R |
| 4,430,985 | 2/1984 | Huneycutt | 126/25 A |
| 4,457,290 | 7/1984 | Edwards | 126/25 A |
| 4,476,849 | 10/1984 | Schmidt | 126/41 R |

FOREIGN PATENT DOCUMENTS 383852  11/1932  United Kingdom ............. 126/41 R Primary Examiner—Samuel Scott
Assistant Examiner—Helen Ann Odar
Attorney, Agent, or Firm—Brown, Martin & Haller

[57] ABSTRACT

A device for use in supporting the hinged cover of a barbecue brazier partially open at a selected position. An elongated planar support member mounts vertically on the rim of the brazier and is held in place by a mounting bracket formed adjacent its lower end. A plurality of upwardly oriented cover hooks are formed in the support member along its length and project therefrom to support the rim of the partially opened cover on a selected hook. The support member has a slot therethrough for receiving the end of a tool used for positioning the support member with safety when the support member has become hot through use. Two embodiments of the device are disclosed with differing support member mounting bracket designs.

2 Claims, 6 Drawing Figures

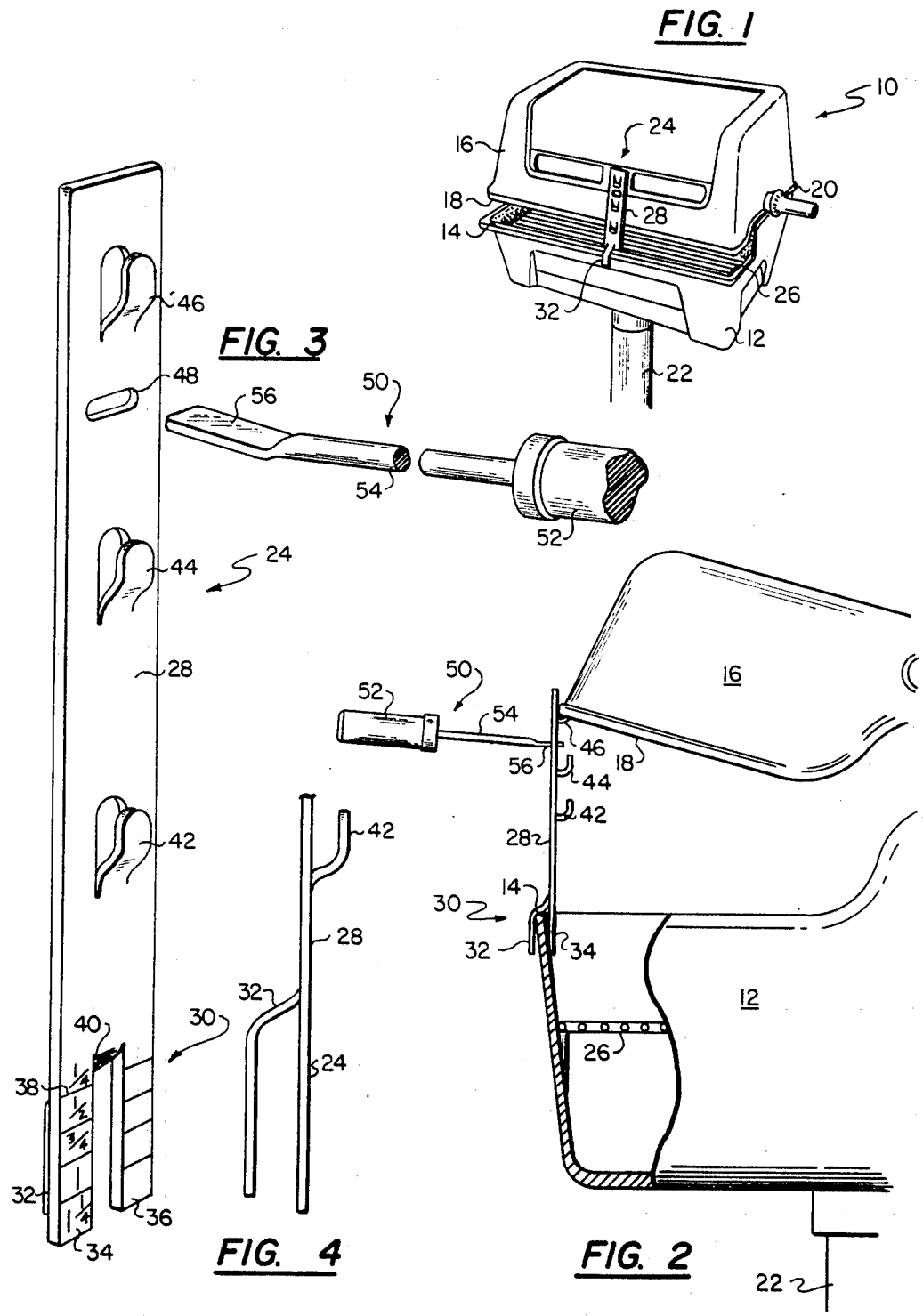

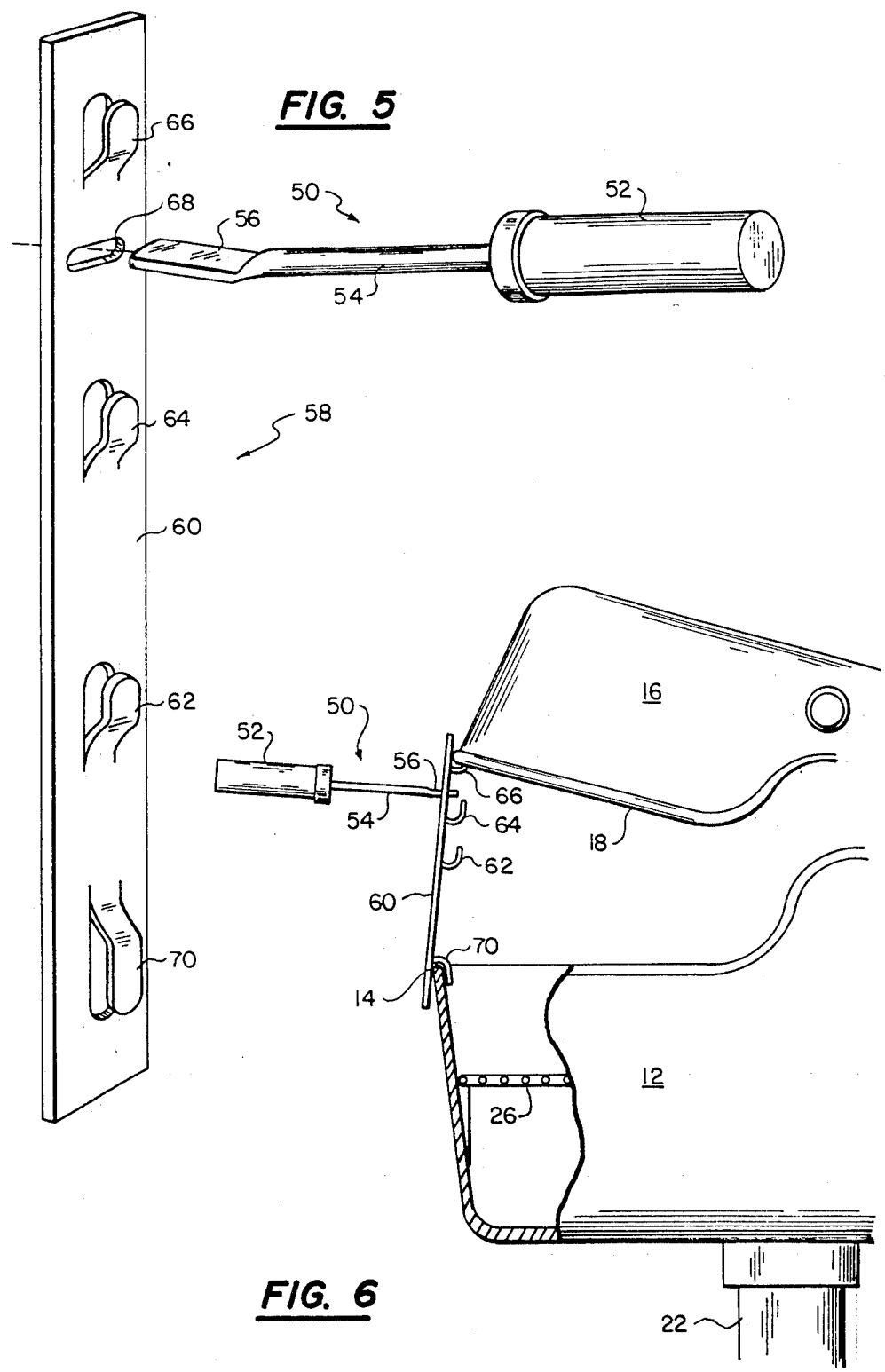

BARBECUE COVER SUPPORT DEVICE

RELATED APPLICATION

This application is a continuation-in-part of my copending application Ser. No. 502,690, filed June 9, 1983, now abandoned.

BACKGROUND OF THE INVENTION

Outdoor cooking enjoys great and growing popularity. Barbecues for such purposes have envolved from simple grill units to sophisticated installations, both fixed and mobile, that provide great range and variety in cooking. Modern barbecues have adjustable air intakes in the brazier, and are equipped with covers with are hinged to the brazier at the rear thereof. The covers are also equipped with variable vent openings for controlling air circulation at the grilling surface when the cover is closed on the brazier. Such a cover for barbecues has added particularly to their versatility.

In contemporary barbecues, the brazier may use burning charcoal as a heat source, or be gas or electrically fired and employ ceramic stones to serve as an additional radiant heat source. Sustained heat and a brazier cover permits a choice of cooking method and technique. With the cover fully opened, meats and other foods may be rapidly grilled with full air circulation and quickly attain the charred surface which is sought to enhance the taste of the food so prepared. Closing the cover over the brazier permits roasting and deeper heat penetration into the food being cooked because of containment of the brazier heat and reflective characteristics of the closed cover. It is often times desirable to grill larger and thicker pieces of meat, poultry, and other foods with the cover closed in order to assure that the interior of the food is fully cooked, but at the same time achieve the barbecued appearance and taste. Grilling with the brazier cover fully, closed, however, risks uncontrolled fires within the barbecue as a result of burning fat and/or overcooking of the food.

Outdoor cooking is both an art and science. To attain greater control of the preparation of particular foods and achieve the results demanded by experienced cooks, it is necessary to have the greater versatility afforded by being able to use a barbecue with the brazier cover in a partially opened condition. Such capability allows the cook to integrate the advantages of open grilling with added heat penetration and desired air circulation. An experienced cook may adjust these factors several times in the course of preparing a meal. In addition, a partially open cover permits viewing the food and basting without rapid fluctuation in the cooking conditions caused by fully opening and closing the cover on the brazier.

Despite the advances in outdoor barbecue designs, they typically do not provide a means for selectively securing the brazier cover in a partially open position to attain the necessary flexibility. To establish a partially open condition for the brazier cover, a cook may be forced to use such devices and objects as are readily available, none of which are completely satisfactory. A stone or a stick may be used to prop open the cover, as well as garden tools and various empty containers. Such makeshift devices seldom provide the spacing desired between the brazier and cover and are awkward in performing the function. Most ad hoc means for supporting the cover in a partially opened condition above the brazier provide insufficient security in attachment to the rim of the cover and brazier and therefore pose a hazard of inadvertent closure and injury. Additionally, such props become hot and therefore are dangerous and difficult to handle in adjusting the spacing between the brazier and cover.

It is desirable, therefore, to provide a device capable of supporting the cover of a barbecue brazier securely in a partially opened and selectable position. It is also desirable to have an easily controlled and safe method of handling the device when it becomes hot due to usage. It is further desirable that such a device be adaptable for use with most barbecue designs, be simple in design, easily manufactured, and inexpensive.

Applicant's invention meets these and other requirements.

SUMMARY OF THE INVENTION

In a first exemplary embodiment of the device, an elongated planar metal support member, mountable vertically between the brazier and cover provides selectable opening between the rims of the brazier and cover. The support member is formed with an attachment bracket in one end which fits over the rim of the brazier and orients the support member in a generally vertical plane. The attachment bracket is formed by a portion of the support member adjacent one end thereof and a downwardly and outwardly projecting brazier hook formed from a median strip of the support member cut and curled to shape the brazier hook. Fabrication of the brazier hook creates a forked structure at the bracket end of the support member which fits inside the brazier. The brazier hook is spaced behind the center of the fork and grips the outside of the brazier. Indicia markings on the tines of the fork structure indicate the length of the tines and are used to adjust their length to fit particular braziers.

A plurality of upwardly oriented cover hooks are spaced along the length of the support member for receiving and supporting the rim of the brazier cover. The cover hooks are formed of strips of the support member cut and curled to project outwardly and upwardly parallel to the support member from the side of the support member opposite the brazier hook. The support member is provided with a slot therethrough. A tool having a heat-insulated handle with a projecting shaft terminating in a control section is provided for manipulating the support member. The control section fits into the slot of the support member. The tool allows positioning and adjustment of the support member safely on the barbecue when it becomes hot during use.

Investigation to reduce fabrication and assembly complexities and costs have resulted in design changes in the barbecue cover support device as exemplified in a second illustrated embodiment of the invention. In this later modification, the support member mounting bracket design is changed. A brazier hook projecting from the same side of the support member as the cover retaining hooks is provided adjacent to the brazier mounting end of the support member. The brazier hook is formed of a strip of the support member cut and curled to project outwardly and then downwardly parallel to the support member.

The primary advantage of the invention is to provide a new and improved device for supporting the cover of a barbecue brazier partially open at selectable positions. The device is simple in design, easy to manufacture, and inexpensive. It grips both the rim of the brazier and the cover securely and provides for varying degrees of opening between te rims. The device does not interfere with use of the barbecue and is easily and safely employed. It may be used with brazier covered barbecues of various design and construction as a separately purchased item, and does not require modification of the barbecues on which it is used. These and other advantages of the applicant's device will be readily apparent upon considering the details of construction and operation as they are more fully described. Reference will be made to the accompanying drawings wherein like numerals refer to like parts throughout.

BRIEF DESCRIPTION OF THE DRAWINGS

FIG. 1 is a perspective view of a typical barbecue brazier and cover with the first illustrated embodiment of the device installed;

FIG. 2 is a side elevation view of the barbecue of FIG. 1, partially cut away, further illustrating the use of the device of FIG. 1;

FIG. 3 is a perspective view o the construction of the device of FIG. 1 and the associated handling tool in greater detail;

FIG. 4 is a partial side elevation view of the first embodiment of the support member illustrating the brazier mounting bracket;

FIG. 5 is a perspective view of a second embodiment of the device and the associated handling tool; and FIG. 6 is a side elevation view of the barbecue of FIG. 1 partially cut away, illustrating the use of the device of FIG. 5.

DETAILED DESCRIPTION OF THE DRAWINGS

A typical outdoor barbecue of contemporary design is illustrated in FIG. 1. It includes a brazier 12 with a rim 14, and a cover 16 having a rim 18. In the barbecue illustrated, the brazier 12 and the cover 16 are connected together by hinges (not shown) along the rear joint line 20, and are mounted on a vertical pedestal 22 rising from a ground support (not shown). The barbecue cover support device 24 is illustrated in place at the front of the barbecue 10 supporting the cover 16 in a partially open position relative to the brazier 12. As illustrated in FIG. 2, a grill 26 mounted within the brazier 12 supports the food being cooked. Barbecue grill depth and barbecue support designs vary, but differences in these latter .pa features do not affect the efficiency of applicant's brazier cover support device.

The details of construction of the first illustrated embodiment of the barbecue cover support device 24 are further illustrated in FIGS. 3 and 4. The device comprises an elongated planar support member 28 which in the illustrated embodiment is a metal bar approximately 9 inches long, 1 inch wide, and 0.075 inches thick. The structural features of the support member 28 to be described are produced by cutting and forming the metal of the support member 28 to produce the structural elements. A brazier mounting bracket 30 is formed at the lower end of the support member 28. A brazier hook 32 is cut medially from the lower end of the support member 28 and is curled to project outwardly and then downwardly parallel to the support member 28. The fabrication of the brazier hook 32 results in the formation of a fork-shaped end in the support member 28 consisting of tines 34 and 36 which in combination with the hook 32 make up the brazier mounting bracket 30 which fits over the brazier rim 14 (FIG. 2). Indicia markings 38 on the tines 34 and 36 indicate the length of the tine from the juncture of the brazier hook curl point 40 to the mark line indicated. The indicia markings 38 are used to indicate the location of cuts to be made in the tines 34 and 36 should the support member 28 be used on a barbecue wherein the grill 26 is supported at a distance below the brazier support rim 14 less than the length of the tines 34 and 36 originally provided.

Barbecue cover retaining hooks 42, 44, and 46 are cut from the metal of the support member 28 and curled to project outwardly and upwardly therefrom parallel to and on the side of the support member 28 opposite the brazier hook 32. The cover retaining hooks are spaced along the length of the support member 28 to provide selectable points of retention for the cover rim 18 and thereby permit selection of an opening between the brazier rim 14 and the cover rim 18. In the first embodiment illustrated, three cover retaining hooks are employed spaced equidistant from each other along the length of the support member 28. This configuration resulted from experimentation of determine optimal cover to brazier partial openings useful in cooking.

Again referring to FIG. 3, an oblong slot 48 in the support member 28 cooperates with the tool 50 to manipulate the support member 28 upon the barbecue 10. The tool 50 has a heat insulated handle 52, and a shaft section 54 which terminates in a control section 56. Control section 56 fits loosely in the oblong slot 48 of the support member 28. The rectangular shape of control section 56 cooperates with the similar configuration of slot 48 to permit both linear and rotational control of the support member 28 by the tool 50.

A second embodiment 58 of the invention is illustrated in FIGS. 5 and 6. As depicted in FIG. 5, the cover support device 58 includes an elongated planar support member 60 with cover retaining hooks 62, 64, and 66 positioned and formed as was described in connection with the first embodiment. An oblong slot 68 which cooperates with the control section 56 of the tool 50 is also provided as previously described. In the second embodiment a brazier hook 70 is formed adjacent to the brazier mounting end of the support member 60. The brazier hook 70 is formed from a strip cut from the support member and curled to project outwardly and parallel to the support member toward the brazier mounting end thereof. The brazier hook 70 projects outwardly from the same side of the support member 60 as do the cover retaining hooks 62–66, but with an opposite hook orientation. The mounting of the cover support device 58 between the rim 14 of the brazier 12 and the cover rim 18 is illustrated in FIG. 6. The support member 60 is held securely on the rim 14 by the brazier hook 70 while the cover rim 16 is secured in the cover hook 66.

OPERATION

The use of the barbecue cover support device 58 and the tool 50 will be described with reference to FIGS. 5 and 6. Support member 58 is installed over the front rim 14 of the brazier 12 while partially raising the cover 16. The brazier hook grips the rim 14 and orients the support member 60 in a generally vertical plane. The brazier hook 70 is positioned inside the brazier, and the rim 14 is held between it and the support member 60. An appropriate cover retaining hook is selected to provide the desired opening between the rim 18 of the cover and 14 of the brazier. Support member 60 may be urged toward or away from the cover 16 using the tool 50 in order to position the rim 18 in the selected cover retaining hook. The tool 50 may be left mounted to the support member 60 or be removed therefrom depending upon the cook's preference. Should adjustment of the cover 16 be needed, the control section 56 of the tool 50 is placed in the slot 68, and the position of the support member 60 manipulated while locating the cover im 18 in a different support hook.

Having described my invention, I claim:

1. A support device for securing the cover of a barbecue in a partially opened position with respect to an underlying brazier, comprising:
   an elongated planar support member having a first and second end, and defining a substantially rectangularly-shaped slot through said support member;
   a plurality of cover retaining hooks spaced along the length of said support member for receiving and supporting the rim of the barbecue cover;
   each of said retaining hooks being cut from said support member and formed to project first outwardly from said support member and then generally parallel to the plane of said support member toward said first end of said support member;
   a brazier hook cut from said support member mediate said second end thereof and formed to project first outwardly from said support member and then generally parallel to the plane of said support member toward said second end thereof; and
   a tool having a heat insulated handle;
   a cylindrical shaft projecting from said handle; and
   said shaft terminating in a elongated control section of substantially rectangular cross section loosely fitable in said support member slot for manipulating said support member with said tool.

2. A barbecue cover support device as recited in claim 1, wherein:
   said brazier hook and said cover retianing hooks project outwardly from opposite sides of said support member.

* * * * *